United States Patent [19]

Keenan

[11] 4,453,107
[45] Jun. 5, 1984

[54] LONG LIFE TUNGSTEN HALOGEN LAMP WITH HYDROGEN BROMIDE AND METHYL BROMIDE

[75] Inventor: James P. Keenan, Reading, Mass.

[73] Assignee: GTE Products Corporation, Stamford, Conn.

[21] Appl. No.: 341,941

[22] Filed: Jan. 22, 1982

[51] Int. Cl.³ .............................................. H01K 1/50
[52] U.S. Cl. .................................... 313/579; 313/643
[58] Field of Search ...................... 313/579, 643, 569

[56] References Cited

U.S. PATENT DOCUMENTS

| | | | |
|---|---|---|---|
| 3,418,512 | 12/1968 | T'Jampens et al. | 313/569 |
| 3,431,448 | 3/1969 | English | 313/579 X |
| 3,502,931 | 3/1970 | Mosby | 313/579 X |
| 3,843,899 | 10/1974 | T'Jampens et al. | 313/579 |
| 4,366,409 | 12/1982 | Nieda et al. | 313/579 |

Primary Examiner—Palmer C. Demeo
Assistant Examiner—Sandra L. O'Shea
Attorney, Agent, or Firm—William H. McNeill

[57] ABSTRACT

Long life tungsten halogen lamps using bromine as the halogen are provided when the lamp contains the bromine as HBr and $CH_3Br$ in a ratio of 2.5 to 1 when used with argon as a carrier gas and 1.5 to 1 when krypton is used.

7 Claims, 1 Drawing Figure

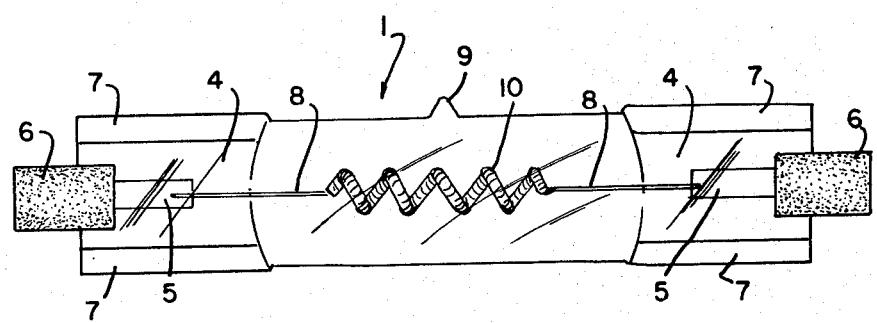

LONG LIFE TUNGSTEN HALOGEN LAMP WITH HYDROGEN BROMIDE AND METHYL BROMIDE

TECHNICAL FIELD

This invention relates to incandescent lamps and more particularly to tungsten halogen lamps.

BACKGROUND ART

Incandescent lamps exhibiting the so called halogen cycle are well known. Such lamps operate on a tungsten-halogen cycle which is a regenerative, continuous process in which tungsten halide is produced when the halide combines chemically with particles of tungsten evaporating from an incandescent tungsten filament. Subsequent thermal decomposition of this compound replaces the tungsten particles on the filament. This process keeps the tungsten particles from depositing on the lamp envelope and producing a black coating which reduces light output.

For many years the preferred halide employed was iodine. Some years ago it was recognized that the use of bromine in place of iodine had beneficial effects, such as increased efficacy, and this substitution was indeed made, and bromine is now the standard in the industry for short to medium life lamps, i.e., lamps having design lives of 25 to 1500 hours.

However, previous attempts to employ bromine in long life lamps (having design life expectancies from 1500 to 3000 hrs.) have not been successful. By including in the lamp sufficient hydrogen bromide or other forms of bromine to meet the life requirements, it was found that hydrogen would permeate the quartz envelope leaving free bromine to attack the tungsten filament and cause early lamp failure. If an insufficient amount were used, the regenerative cycle would fail and lamp blacking would occur.

DISCLOSURE OF THE INVENTION

It is, therefore, an object of the invention to obviate the disadvantages of the prior art.

It is another object of the invention to enhance incandescent lamps.

Yet another object of the invention is the provision of a long life lamp employing bromine.

These objects are accomplished, in one aspect of the invention, in a sealed incandescent lamp which contains a tungsten filament and a fill gas. The fill gas is comprised substantially of argon and contains hydrogen bromide (HBr) and methyl bromide ($CH_3Br$) in a volume ratio of about 2.5 to 1.

In an energy efficient version of such a lamp wherein the fill gas is substantially krypton, the preferred ratio of HBr to $CH_3Br$ is 1.5 to 1.

This combination of halogens, with some gettering action from the carbon, provides excess hydrogen to moderate the bromine activity over 3000+hours of lamp life, as well as sufficient bromine to provide clean bulb walls.

While many previous combinations of halogens have been tried in the past, none have been as successful and repetitive as the instant invention.

BRIEF DESCRIPTION OF THE DRAWING

The single FIGURE illustrates a lamp which can employ the invention.

BEST MODE FOR CARRYING OUT THE INVENTION

For a better understanding of the present invention, together with other and further objects, advantages and capabilities thereof, reference is made to the following disclosure and appended claims taken in conjuncton with the above described drawing.

Referring now to the drawing with greater particularity, a typical lamp employing the invention comprises a tubular envelope 1 having flattened end portions 4,4 through each of which a molybdenum ribbon 5 is sealed as a lead-in conductor. Wires not shown extend from the outside ends of the ribbons 5 to contact caps 6,6. The flattened ends will generally have ridges 7,7 on their outer edges as shown so that the glass when pressed will be roughly parallel with the outside of tubular envelope 1. This gives the glass pressed out from the flattened portion a place in which to collect and serves also to strengthen the end portions.

The envelope 1 has the customary sealed exhasut tube 9 and contains a fill gas at a cold lamp pressure of 2 to 4 atmospheres; and, preferably, 2½ to 3 atmospheres.

In a lamp according to an embodiment of the invention the fill gas comprises about 99.74% argon, about 0.25% hydrogen bromide and about 0.1% methyl bromide, thus providing the HBr to $CH_3Br$ volume ratio of 2.5 to 1.

If the lamp is to be of the energy saving variety, the fill gas is krypton and the ratio of HBr to $CH_3Br$ is 1.5 to 1.

To achieve greater economies in production of the latter lamp, absolutely pure krypton (which is very expensive) is not necessary, and a krypton gas containing up to about 1% xenon is equally advantageously employed.

The lamp envelope 1 can be of quartz or other suitable material such as a refractory glass comprised almost entirely of silica.

Tungsten wires 8,8 extend from the inner ends of the ribbons 5,5 to the inside of the bulb and support the tungsten filament 10.

While there have been shown and described what are at present considered to be the preferred embodiments of the invention, it will be apparent to those skilled in the art that various changes and modifications can be made herein without departing from the scope of the invention as defined by the appended claims.

I claim:

1. A sealed incandescent lamp containing a tungsten filament and a fill gas, said fill gas comprising hydrogen bromide and methyl bromide in a volume ratio of about 2.5 to 1, and argon.

2. The lamp of claim 1 wherein said fill gas comprises, by volume, about 0.25% hydrogen bromide; about 0.1% methyl bromide; and the remainder argon.

3. The lamp of claim 1 or 2 wherein said fill gas has a cold lamp pressure of from about 2.0 to 4.0 atmospheres.

4. A sealed incandescent lamp containing a tungsten filament and a fill gas; said fill gas comprising hydrogen bromide and methyl bromide in a volume ratio of about 1.5 to 1, and krypton.

5. The lamp of claim 4 wherein said fill gas comprises, by volume, about 0.15% hydrogen bromide; about 0.1% methyl bromide; and the remainder is essentially krypton.

6. The lamp of claim 5 wherein said remainder includes less than 1% xenon.

7. The lamp of claim 4, 5 or 6 wherein said fill gas has a cold lamp pressure of from about 2.0 to 4.0 atmospheres.